United States Patent [19]

Henke

[11] 4,024,605

[45] May 24, 1977

[54] FLEXIBLE HINGE PIN

[75] Inventor: Albert E. Henke, Naperville, Ill.

[73] Assignee: Flexible Steel Lacing Company, Downers Grove, Ill.

[22] Filed: Dec. 18, 1975

[21] Appl. No.: 642,075

[52] U.S. Cl. .................. 24/33 P; 16/168; 57/149

[51] Int. Cl.² .......................................... F16G 3/02

[58] Field of Search .............. 24/33 R, 33 P, 33 K, 24/33 B, 33 C, 31 H, 31 W, DIG. 7; 74/231 J; 57/149, 145; 16/161, 168

[56] References Cited
UNITED STATES PATENTS

| 1,633,939 | 6/1927 | Grace | 24/33 P |
|---|---|---|---|
| 2,962,782 | 12/1960 | Beach | 24/33 B |
| 3,176,358 | 4/1965 | Leflon | 24/33 B |
| 3,319,217 | 5/1967 | Phillips | 24/33 P |
| 3,831,370 | 8/1974 | Gilmore | 57/145 |

*Primary Examiner*—Paul R. Gilliam
*Assistant Examiner*—Kenneth J. Dorner
*Attorney, Agent, or Firm*—Fitch, Even, Tabin & Luedeka

[57] ABSTRACT

A flexible hinge pin is disclosed for connecting belt fasteners which are attached to adjacent ends of a conveyor belt. The hinge pin includes a central stranded core with an outer spirally wrapped metallic ribbon overlay. Means in the form of end caps are secured to the opposite ends of the stranded core to prevent unwinding of the core and ribbon overlay. A flexible plastic layer surrounds the ribbon overlay and provides a seal between the end caps.

3 Claims, 6 Drawing Figures

FLEXIBLE HINGE PIN

The present invention relates generally to hinge pins used for coupling hinged belt fasteners which are attached to the adjacent ends of a conveyor belt.

Conveyor belts are well known as an efficient means for conveying materials or products, and have been used in a wide variety of applications and environments. They are particularly useful, however, for moving large quantities of aggregate or similar bulk materials such as ore, coal or grain over long distances. In such applications, the conveyor belt is often formed into a trough-shaped configuration by a series of upturned idler rollers which underlie the belt to prevent spillage of material over the side of the conveyor from vibration or shifting. On the return half of the conveying cycle, the trough is not required, and the conveyor belt is usually flat. Thus, the conveyor belt is flexed between the upturned trough shape and the flat configuration during each conveyor cycle. In such conveyors, the hinge pin will also be flexed into and from a trough-like configuration. In other installations, the hinge pin may not be bent in this manner.

Because of the heavy loads that may be encountered in industrial conveyor belt applications and the large forces that are transmitted through the conveyor belt, it is often necessary to join the ends of the conveyor belt by hinged belt fasteners rather than weaker means, such as sewing or bonding. This usually includes a strip of belt fasteners attached to each end of the conveyor belt and held together by a hinge pin, which is threaded through interleaved U-shaped portions of adjacent belt fasteners to extend the width of the conveyor belt.

To allow the conveyor belt to conform to the shape of a trough where the belt ends are joined, it is necessary that the hinge pin be relatively flexible. Present designs usually incorporate a wire strand core to provide increased flexibility over a solid metal pin, which is relatively rigid. However, the hinge pin must also have sufficient strength to withstand the large tensile forces that are transmitted along a loaded conveyor belt, and it must further be capable of working in the various environments in which conveyor belts are used. Hinge pin failure, which disables the conveyor belt, is more costly in terms of downtime and reduced efficiency of the overall operation or process in which the particular conveyor belt is being used than in terms of repair and replacement.

Hinge pins presently used, however, are known to have several deficiencies. For example, hinge pins which are constructed simply from a wire strand portion with a protective metal overwrap are particularly susceptible to environmental hazards. When used for conveying dry bulk materials such as coal or ore, the dust and grit from the load may work into the hinge pin after repeated flexing and increase the friction and wear on the hinge pin. Such hinge pins, especially when constructed of ordinary carbon steel, also are more vulnerable to the presence of caustic or corrosive liquids or gases, e.g., mine water or salt water, which can seriously shorten the useful lifetime of a hinge pin.

Additionally, hinge pins which have been constructed of a wire strand portion alone or in a manner such that the wire strand portion is otherwise exposed directly to the load of the belt fastener elements are less resistant to the large tensile forces which are transmitted along a conveyor belt. The direct application of the load on the wire strand portion by the belt fastener causes increased point forces on individual strands, resulting in the breakage of one strand at a time until the complete hinge pin fails. Moreover, in some applications, when the hinge pin fails at one location, the belt tension is sufficiently strong to pull the remainder of the pin out of the hinge fasteners, resulting in complete belt failure.

Accordingly, it is a general object of the present invention to provide an improved hinge pin which alleviates some of the deficiencies of known hinge pins. Another object of the present invention is to provide a flexible hinge pin that is resistant to environmental hazards. A further object of this invention is to provide a flexible hinge pin that can withstand the load forces encountered in holding the ends of a conveyor belt together.

These and other objects are disclosed in the following detailed description and drawings, of which FIG. 1 is a fragementary plan view, partially in section, of a flexible hinge pin constructed in accordance with the present invention joining belt fasteners which are attached to adjacent ends of a conveyor belt.

Figure 1:
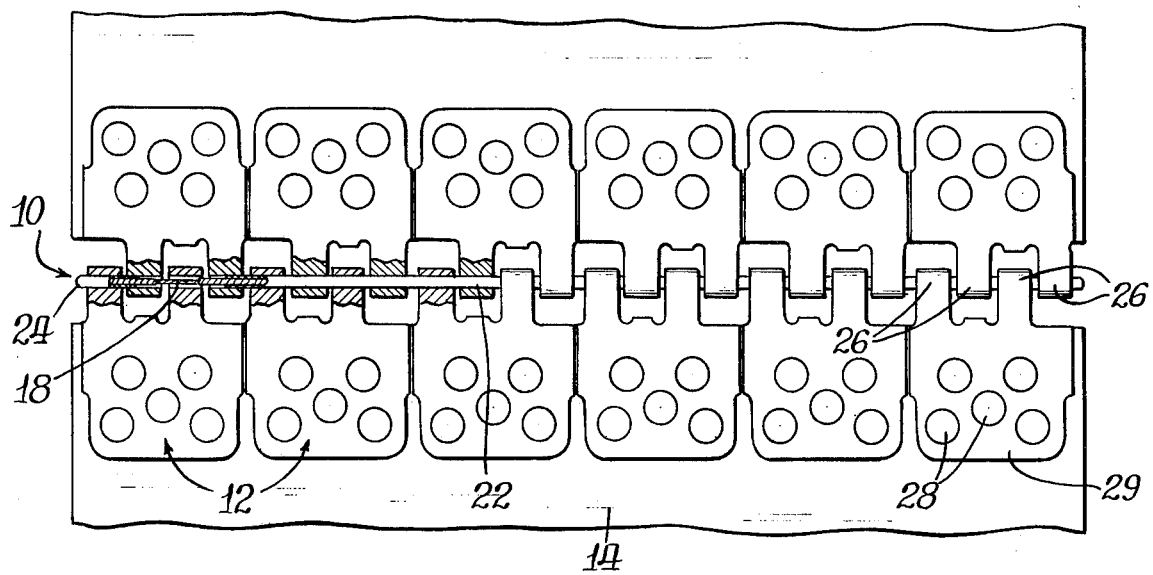

The present invention is generally embodied in a hinge pin 10 that has increased strength and improved resistance to breakage and environmental hazards, for use in joining belt fasteners 12 attached to each end of a conveyor belt 14 to form a generally continuous belt surface for conveying or transporting various materials.

In accordance with the present invention, the hinge pin 10 is constructed by helically wrapping a metallic ribbon 16 about a flexible stranded core 18 to absorb the direct load of the belt fastener 12 and thereby protect the individual strands from being broken. The helical winding allows the ribbon to bend more readily when the hinge pin is bent into a trough shape with the conveyor belt, the helical wraps being spaced sufficiently apart to allow the overlay to move or shift when the core is flexed, but not so far apart as to expose individual core strands 20 directly to contact with the belt fasteners. The helical metallic overlay is surrounded by and encapsulated in a flexible plastic coating 22 and cooperates with means such as end caps 24 to retain any lubricant within the hinge pin and to protect the core and the ribbon overlay from grit, dirt or caustic liquids.

Turning now to a more detailed description of the drawings, which illustrate the present invention in its preferred embodiments only, the hinge pin 10 is shown in FIG. 1 as it may be used to hold together the ends of the conveyor belt 14. In the particular application illustrated, the belt fasteners 12 on one end of the belt have hinge pin receiving, U-shaped portions 26 interleaved with similar U-shaped portions 26 secured to the other end of the belt. A gauge pin (not shown) is inserted through the interleaved U-shaped portions to align them before the hinge pin is inserted. Each of the belt fasteners 12 is firmly secured to a belt end by staggered rivets 28 which extend through the conveyor belt and through upper and lower flat plates 29 with ends of the rivets having an upper and lower head abutting the outer facing side of the upper and lower plates 29. A preferred application and attachment of the belt fasteners to the conveyor belt is more particularly described in U.S. Pat. No. 3,913,180, which description is hereby incorporated by reference into this specification.

Figure 2:
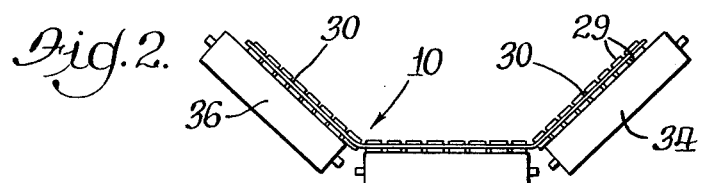
FIG. 2 is a vertical view of the configuration that the hinge pin and belt fasteners assume on underlying rollers forming a trough-shaped configuration for transporting bulk materials.

As noted earlier, one particular application for conveyor belts is transporting large quantities of bulk or aggregate material such as coal, ore, sand, gravel, grain and similar products. In such applications, where the materials are loose and can shift on shock or vibration, it is advantageous to form the conveyor belt 14 into a trough configuration to more efficiently contain the material. Upturned sides 30 of the belt prevent spillage over the side of the conveyor as the material is carried along. Because the conveyor belt is usually flexible or pliable, the trough configuration may be achieved, as illustrated in FIG. 2, by providing three sets of underlying idler rollers upon which the conveyor belt moves. The bottom set of rollers 32 is generally horizontal and the other two sets, 34 and 36, are secured by brackets or braces (not shown) at an upward angle from ends of the bottom rollers. Resting on these rollers, the pliable conveyor belt conforms approximately to the roller geometry, with the resultant cross-sectional through shape illustrated in FIG. 2. The particular angle between the side rollers and the bottom rollers may vary, depending on the particular trough depth desired. A steeper side roller will usually provide a deeper trough.

The conveyor belt ends also conform to the shape of the underlying rollers because the hinge pin 10 is flexible, and because the belt fasteners 12 are made of a series of individual belt fasteners 12 rather than a solid fastener strip. The space between the fastener elements allows the conveyor belt to bend or stretch to conform approximately to the shape of the rollers.

Although the belt 14 is preferably trough shaped by the underlying rollers 32, 34 and 36 while carrying a load, on the return portion of the conveying cycle the belt is flat and is usually supported by widely spaced horizontal rollers that are secured by appropriate structural members (not shown) beneath the trough rollers. Because of the repeated cycling and bending and unbending of the belt, the hinge pin 10 must be sufficiently resilient and have sufficient strength to endure the repeated flexing.

In the preferred embodiments of the present invention, the hinge pin 10 generally includes the central wire-stranded core 18, the flat metallic ribbons overlay 16 to protect the stranded core from damaging direct contact with the fastener elements 26, end caps 24 swaged over each end of the strands to prevent unwinding of the strands and the overlay of the stranded core, and the plastic coating 22 to protect the pin from particulate matter such as dust or grit and corrosive liquids, as well as retaining any lubricant within the hinge pin.

The central stranded core 18 extends along the length of the hinge pin 10, which is usually approximately the same as the conveyor width, and provides overall flexibility allowing the pin to bend readily if the belt is troughed. The stranded core is fabricated of multiple wire strands 20, which are twisted tightly together, generally with a left lay, to form the roughly circular stranded core or bundle 18. Because the core is made of many smaller diameter strands, it is more flexible than, for example, a solid metal pin; and the strands also add to the strength necessary to resist the large tensile forces transmitted along the conveyor belt 14.

The individual strands 20 are generally cylindrical and run the length of the stranded core 18. The strands may be constructed of any material with sufficient strength and flexibility but they are preferably metallic, and may be made of carbon steel for ordinary uses or stainless steel for increased resistance to corrosion or wear.

Figure 3:
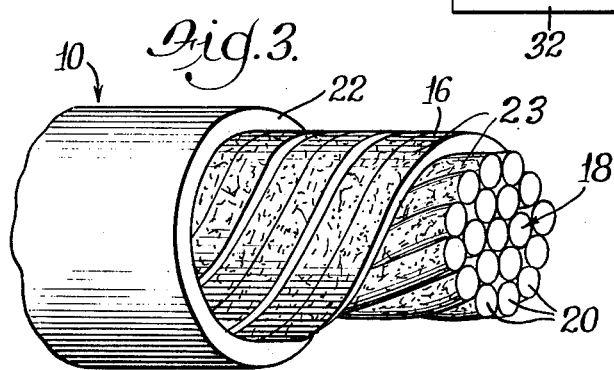
FIG. 3 is an oblique view, partially removed, of a hinge pin constructed in accordance with the present invention.
Figure 4:
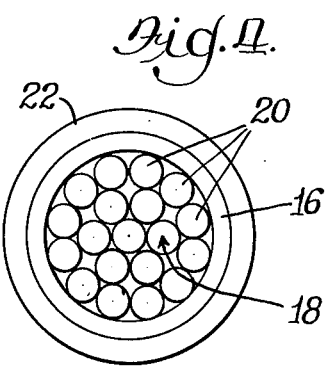
FIG. 4 is a vertical sectional view of the hinge pin of FIG. 3.

In the embodiment illustrated in FIGS. 3 and 4, the strands 20 are all of the same diameter. However, as shown in the other embodiment in FIGS. 5 and 6, the stranded core 18 may include interior strands of a smaller diameter circumscribed by strands of a larger diameter. This arrangement is believed to be advantageous, particularly in larger hinge pins, because the surface of the large diameter strands is less acute than the surface of smaller strands and presents more surface area for bearing against the pressure from the metallic ribbon overlay which surrounds the stranded core and absorbs the direct belt forces transmitted through the fastener elements 26.

When the coveyor belt 14 is loaded with heavy materials such as coal, ore or the like, large longitudinal forces are transmitted to the conveyor from the driving machinery to move the load and to overcome the frictional resistance of the many rollers upon which the belt moves as well as to overcome gravitational forces when the conveyor is inclined and inertia during startup. These longitudinal forces are transmitted along the conveyor belt and act through the fastener elements 26 principally as a shearing force on the hinge pin 10.

Because direct contact between the U-shaped portions 26 of the belt fasteners and the stranded core 18 may create large point forces on individual strands 20, resulting in the progressive failure of strands until the complete pin fails, the flat metallic ribbon 16 is tightly and helically wrapped about the stranded core to substantially cover the strands and to absorb the longitudinal forces within the belt that are transmitted through the belt fasteners. The metallic ribbon is generally a flat wire, with sufficient thickness to resist fracture or fatigue under the force of the fastener elements and the repeated flexing. Presently, for hinge pins with a finished diameter up to at least 0.41 inches (1.04 cm), the flat ribbon 16 is in the form of a flat wire having a thickness of 0.026 inches (0.07 cm) and width of 0.125 inches (0.32 cm), with a Rockwell hardness, $R_c$, 25 to 35. Like the strands, the metallic ribbon may be made of carbon steel, stainless steeel or other materials, depending on the environment of the conveyor belt and the need for corrosion resistance, and the edges of the ribbon may also be rounded to reduce friction against the stranded core.

Figure 5:
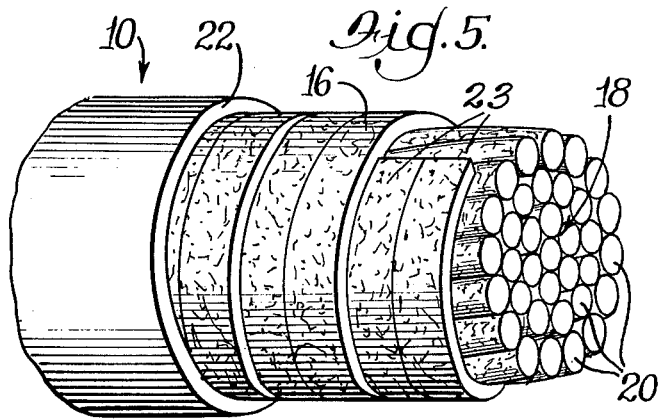
FIG. 5 is an oblique view, partially removed, of another hinge pin constructed in accordance with the present invention.
Figure 6:
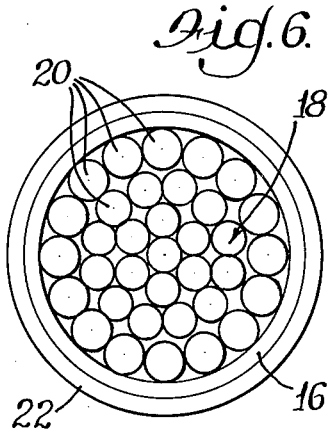
FIG. 6 is a vertical sectional view of the hinge pin of FIG. 5.

Preferably, the metallic ribbon 16 is double-wrapped—two adjacent ribbons are wrapped simultaneously about the stranded core 18. As shown in FIGS. 3 and 5, the ribbon overlay may be wrapped about the core 18 at different pitches. FIG. 3 illustrates the pitch of wrap used with smaller diameter hinge pins, such as those having a finished diameter of approximately 0.25 inches (0.64 cm), and FIG. 4 represents the pitch presently used on hinge pins with a finished diameter of approximately 0.41 inches (1.04 cm).

To retain the flexibility of the stranded core 18, each double wrap is spaced from the previous wrap to allow for shifting or movement of the ribbon during flexing. A spacing of approximately 0.030 inches (0.076 cm) is sufficient to allow flexing of hinge pins having a diameter up to at least 0.41 inches (1.04 cm), but without exposing the stranded core 18 to direct contact with the fasteners 12 so that the ribbon overlay absorbs most of the direct fastener force.

The metal overlay 16 is applied by a helical winding apparatus which is oiled and greased and deposits onto the metallic ribbon an amount of oil or grease 23 which reduces friction between the metal overlay and strands. Some of this oil and grease may work itself into the core. The outer plastic coating 22 seals this oil and grease in the hinge pin, at least for a limited period of time.

To seal the ends of the hinge pin 10 and to prevent any unwinding or unravelling of the overlay 16 or the core 18, each end of the over-wrapped core is inserted into a cylindrical metal end cap 24 which is then swaged against the overlay to secure it in place. The closed end of the cap is oval shaped, or the outside edges are otherwise relieved to facilitate insertion of the hinge pin into the hinge pin retaining, U-shaped portions 26 of the fasteners 12 when the ends of the conveyor belt 14 are joined. Other means, such as silver soldering or welding may also be used to hold the end cap in place.

To prevent the escape of lubricant and protect the stranded core 18 and helical metallic overlay 16 from dust, grit and corrosive liquids, the flexible plastic coating 22 covers and seals the overlay 16 between the end caps 24. Preferably, the coating is a polyamide material, such as Nylon, which is tough, resistant to corrosive materials and has a self-lubricating effect which reduces wear on the hinge pin. Nylon has a particular advantage; upon continued use a Nylon coating may deform under the force of the fastener elements 26, which deformation serves to resist complete pull-out of the hinge pin, which is total belt failure, if the pin breaks or fails at only one location.

The plastic coating preferably does not cover the end caps 24 but only extends up to and adjacent the inward edge of the cap. Such a coating may actually be extruded onto the metallic overlay during manufacture of the hinge pin. For a hinge pin approximately 0.21 inches (0.53 cm) in overlay diameter, it has been found that about 15 pounds (6.8 kg) of nylon is needed for every thousand feet of hinge pin to provide a sufficiently thick coating for the purposes described above.

By way of example only, tests have been made to compare the performance of a hinge pin 10 of the present invention to a commercially used and conventional hinge pin and it has been found that the pin 10 excels under both static and dynamic testing. For example, the hinge pin 10 has withstood a static tension load applied normal to the longitudinal direction of the pin and through belt fasteners of the type illustrated herein of about 6,000 pounds before the hinge pin bends significantly into a crankshaft-like shape. In a similar test, conventional pins bend into crankshaft-like shapes at a static pull of 5,050 pounds. The pin 10 of the present invention is particularly more effective under dynamic testing in which the belt is formed into a trough shape, such as shown in FIG. 2, with the rollers 34 and 36 being disposed at an angle of 35° to the horizontal and with the belt being alloed to return to a flat shape during the return run. In this dynamic testing, a tensile load of 200 pounds per inch across the width of the belt was applied through 10 inch diameter pulleys at opposite ends of the conveyor. The conveyor was run at 750 feet per minute. At such dynamic testing loads and speed, commercial hinge pins lasted in the range of 7 to 28 hours before failure, whereas the hinge pins 10 of the present invention lasted in the range of 48 to 79 hours before failure. Of course, the hinge pins failed more quickly in these tests than they would in normal usage.

It may thus be seen that the present invention provides new and improved flexible hinge pin having improved strength and increased resistance to environmental hazards, such as dust, grit, and corrosive materials. The present invention was described in terms of the preferred embodiments for purpose of explanation only, and it is not intended to disclaim the various changes which may be made in the preferred embodiments by one skilled in the art, including those changes which may be immediately apparent, such as the type of material, and others which may be developed only after study.

Various features of the invention are set forth in the following claims.

What is claimed is:

1. A hinge pin for connecting belt fasteners attached to adjacent ends of a conveyor belt comprising an elongated internal stranded core substantially circular in cross-section and having a plurality of individual wire strands extending substantially the length of the pin, said wire strands comprising larger diameter strands spaced around the circumference of said cross-section with smaller diameter strands interior of said large diameter strands, a metallic ribbon overlay having a plurality of wraps each surrounding said stranded core and helically wrapped about said core adjacent said larger diameter strands to substantially enclose said core to protect the individual wire strands against direct shear contact with the belt fasteners, shear loading by said belt fasteners being applied across said overlay, said helical wraps of said overlay being spaced from adjacent wraps to facilitate bending flexibility of the said hinge pin, end caps swaged to said spiral overlay and said stranded core for securing said strands and said metallic ribbon overlay against unwinding and separation, and an external flexible plastic coating on said overlay and extending between said caps to protect said spiral overlay and said strand portion from environmental hazards, said hinge pin being flexible for repeated bending between a linear position and a position in which the ends of the said pin are upturned to a trough configuration.

2. A hinge pin in accordance with claim 1 in which said metallic overlay includes a pair of adjacent ribbons, and each wrap of said pair being spaced approximately 0.03 inches from the neighboring wrap of said pair of adjacent ribbons.

3. A hinge pin for connecting belt fasteners attached to adjacent ends of a conveyor belt comprising an elongated internal stranded core having a plurality of individual wire strands extending substantially the length of the pin, a metallic ribbon overlay having a plurality of wraps, each surrounding said stranded core, helically wrapped about said core to substantially enclose the same to protect the individual wire strands against direct shear contact with the belt fasteners, shear loading by said belt fasteners being applied across said overlay, said helical wraps of said overlay being spaced from adjacent wraps to facilitate bending flexibility of the said hinge pin, lubricant carried on the surfaces of said overlay and lubricant carried on the surfaces of at least the outer strands of said stranded core to reduce friction during bending, end caps swaged to said spiral overlay and said stranded core for securing said strands and said metallic ribbon overlay against unwinding and separation, and an external flexible plastic coating on said overlay and extending between said caps to protect said spiral overlay and said strand portion from environmental hazards, and to retain said lubricant on said stranded core and overlay interior of said coating, said hinge pin being flexible for repeated bending between a linear position and a position in which the ends of the said pin are upturned to a trough configuration.

* * * * *